(12) United States Patent
Dogan et al.

(10) Patent No.: US 8,596,342 B2
(45) Date of Patent: Dec. 3, 2013

(54) HEAT EXCHANGER HOUSING, HEAT EXCHANGER OR MODULAR UNIT HAVING ONE OR MORE HEAT EXCHANGERS, EXHAUST-GAS RECIRCULATION SYSTEM, CHARGE-AIR SUPPLY SYSTEM AND USE OF THE HEAT EXCHANGER

(75) Inventors: Aydin Dogan, Stuttgart (DE); Thomas Mitchell, Sindelfinden (DE)

(73) Assignee: Behr GmbH & Co. KG, Stuttgart (DE)

( * ) Notice: Subject to any disclaimer, the term of this patent is extended or adjusted under 35 U.S.C. 154(b) by 1176 days.

(21) Appl. No.: 12/182,791

(22) Filed: Jul. 30, 2008

(65) Prior Publication Data

US 2009/0032212 A1    Feb. 5, 2009

(30) Foreign Application Priority Data

Jul. 31, 2007  (DE) .......................... 10 2007 036 301

(51) Int. Cl.
*F28D 7/16*   (2006.01)
*F28F 27/02*  (2006.01)

(52) U.S. Cl.
USPC .......................................... 165/164; 165/103

(58) Field of Classification Search
USPC .................... 165/164, 157, 158, 103, 162
See application file for complete search history.

(56) References Cited

U.S. PATENT DOCUMENTS

| | | | | |
|---|---|---|---|---|
| 3,650,318 A | * | 3/1972 | Avery | 165/215 |
| 5,036,668 A | * | 8/1991 | Hardy | 60/599 |
| 6,269,870 B1 | * | 8/2001 | Banzhaf et al. | 165/158 |
| 7,032,577 B2 | * | 4/2006 | Rosin et al. | 123/568.12 |
| 7,077,190 B2 | * | 7/2006 | Hayashi et al. | 165/159 |
| 7,168,419 B2 | | 1/2007 | Rosin et al. | |
| 2005/0199381 A1 | * | 9/2005 | Mercz et al. | 165/172 |
| 2006/0032613 A1 | * | 2/2006 | Brost et al. | 165/103 |
| 2006/0048926 A1 | * | 3/2006 | Richter | 165/165 |
| 2006/0288694 A1 | * | 12/2006 | Hayashi | 60/298 |
| 2007/0074858 A1 | * | 4/2007 | Agee et al. | 165/146 |
| 2007/0125081 A1 | * | 6/2007 | Czarnowski et al. | 60/599 |
| 2007/0157983 A1 | * | 7/2007 | Beck et al. | 137/875 |

FOREIGN PATENT DOCUMENTS

| | | |
|---|---|---|
| DE | 199 62 863 A1 | 6/2001 |
| DE | 102 03 003 A1 | 8/2003 |
| DE | 10 2005 005 190 A1 | 9/2005 |
| DE | 10 2007 033 148 A1 | 1/2008 |

* cited by examiner

*Primary Examiner* — Tho V Duong
(74) *Attorney, Agent, or Firm* — Foley & Lardner LLP

(57) ABSTRACT

The invention relates to a heat exchanger housing (1) for at least one heat exchanger for exchanging heat between a first fluid, in particular an exhaust gas or charge air, and a second fluid, in particular a coolant (6). According to the concept of the invention, a bypass duct (40) is integrated in the heat exchanger housing (1), with the housing having a housing body (10) with a chamber which is designed to be traversed by the second fluid and to hold a number of flow ducts which can be traversed by the first fluid; a bypass duct (40) which is designed to be traversed by the first fluid; with the chamber and the bypass duct (40) being formed in one piece with the housing body (10).

22 Claims, 2 Drawing Sheets

HEAT EXCHANGER HOUSING, HEAT EXCHANGER OR MODULAR UNIT HAVING ONE OR MORE HEAT EXCHANGERS, EXHAUST-GAS RECIRCULATION SYSTEM, CHARGE-AIR SUPPLY SYSTEM AND USE OF THE HEAT EXCHANGER

CROSS-REFERENCE TO RELATED PATENT APPLICATIONS

The right of foreign priority is claimed under 35 U.S.C. §119(a) based on Federal Republic of Germany Application No. 10 2007 036 301.1, filed Jul. 31, 2007, the entire contents of which, including the specification, drawings, claims and abstract, are incorporated herein by reference.

BACKGROUND OF THE INVENTION

The invention relates to a heat exchanger housing for at least one heat exchanger for exchanging heat between a first fluid and a second fluid. The invention also relates to a heat exchanger or a modular unit having one or more heat exchangers for exchanging heat between a first fluid and a second fluid. The invention also relates to an exhaust-gas recirculation system, a charge-air supply system and a use of the heat exchanger or of the modular unit.

An exhaust-gas recirculation system or charge-air supply system, in particular with cooled exhaust gas and/or charge air, is used in modern vehicles on account of legal requirements for reducing particles and pollutants, in particular nitrogen oxide emissions. Here, on the one hand, the demands on exhaust-gas purification and the exhaust-gas mass flow rates which must be dealt with increase, and on the other hand, such systems and in particular the heat exchanger developments necessary for this purpose are largely cost-driven.

A heat exchanger serves fundamentally to exchange heat between a first fluid, in particular an exhaust gas in the case of an exhaust-gas cooler or charge air in the case of a charge-air cooler, and a second fluid, in particular a coolant, for example a water-based coolant or some other liquid or gaseous coolant. Exhaust-gas coolers in particular are if appropriate constructed with a bypass pipe in order to reach the operating temperature of an internal combustion engine more quickly. For this purpose, a bypass duct may for example be closed off by means of a flap once the operating temperature of the internal combustion engine has been reached, and a heat exchanger for taking over cooling operation is provided. For example, DE 10 203 003 A1 discloses a single-stage heat exchanger system with an integrated bypass duct and bypass flap. Also known, from DE 600 243 90 T2, is a two-stage system of heat exchangers with an integrated bypass duct with a bypass flap. It is fundamentally known, in order to reduce costs, to integrate a bypass duct and/or a bypass flap, for example as per DE 199 62 863 A1 or DE 198 41 927 A1, in a module together with a heat exchanger. Such systems or modules do however leave room for improvement. Until now, to produce such systems and/or modules, it has been necessary to produce a bypass duct in the form of a bypass pipe separately from the module or the system, and for said bypass duct to be bundled into a heat exchanger housing and subsequently welded to a suitable connecting part of the heat exchanger, for example a base on the block of the heat exchanger.

SUMMARY OF THE INVENTION

The invention addresses this: it is the object of the invention to specify a device, in particular a heat exchanger housing and a heat exchanger, in which the integration of a bypass duct can be realized in a more simple and cost-effective manner.

With regard to the device, the object is achieved by means of the invention with a heat exchanger housing of the type specified in the introduction, which, according to the invention, has a housing body with a chamber which is designed to be traversed by the second fluid and to hold a number of flow ducts which can be traversed by the first fluid; a bypass duct which is designed to be traversed by the first fluid; with the chamber and the bypass duct being formed in one piece with the housing body. In other words, the concept of the invention provides that the bypass duct is integrated in a unipartite fashion in the heat exchanger housing. This has the advantage that the bypass duct and the housing can be produced in a particularly simple and cost-saving manner in a single production step. As a result, the separate production steps, which generate cost expenditure and are in part complex, for a bypass pipe or the bundling of a bypass pipe in a housing, are dispensed with.

It has been found that a cost-saving even on the basis of the material costs alone is higher the longer a longitudinal extent of the bypass duct or of the heat exchanger is.

With regard to the device, the object is also achieved by means of the invention by means of a heat exchanger or a modular unit having one or more heat exchangers of the type specified in the introduction, which has, according to the invention: a block for separate and heat-exchanging guidance of the first and second fluids, which block has a heat exchanger housing, with an integrated bypass duct, according to one of the preceding claims, and a number of flow ducts which can be traversed by the first fluid and which are held in the heat exchanger housing.

The first fluid is preferably an exhaust gas and/or charge air. A heat exchanger can preferably be formed as an exhaust-gas heat exchanger and/or charge-air heat exchanger. The second fluid is preferably a coolant, for example a water-based coolant or some other liquid coolant. A gaseous coolant may also be suitable.

The concept of the invention also includes an exhaust-gas recirculation system for an internal combustion engine, having an exhaust-gas recirculation line, a compressor and a heat exchanger of the above-mentioned type in the form of an exhaust-gas heat exchanger, in particular an exhaust-gas cooler.

The concept of the invention also includes a charge-air supply system for an internal combustion engine, having a charge-air induction system, an air filter, a compressor and a heat exchanger of the above-mentioned type in the form of an exhaust-gas heat exchanger, in particular an exhaust-gas cooler.

The invention also includes a use of the heat exchanger or of the modular unit of the above-mentioned type for an internal combustion engine, in particular a diesel engine or spark-ignition engine of a motor vehicle.

Advantageous refinements of the invention can be gathered from the subclaims and also specify in detail advantageous possibilities for realizing the above-explained concept within the context of the set object, and regarding further advantages.

The bypass duct is preferably the only bypass duct and/or preferably extends along the entire length of a longitudinal extent of the housing body. In particular, the bypass duct can for this purpose be of practically the same length as the chamber. The bypass duct can be formed, in cross section, corresponding to an application, and can in particular be rectangular, oval or semi-oval.

The chamber is preferably designed to hold the flow ducts of two heat exchangers, in particular a high-temperature heat exchanger and a low-temperature heat exchanger. In one particularly preferred refinement, a pedestal is for this purpose formed in one piece with the housing body on an inner side of the housing body. The pedestal is preferably arranged transversely with respect to the longitudinal extent of the housing body. Said pedestal advantageously has a trapezoidal cross section. It is therefore possible for in each case the flow ducts of a first heat exchanger and of a second heat exchanger to be arranged in a first part and second part respectively of the chamber, which parts are marked by the pedestal. Here, a pedestal which is trapezoidal in cross section permits a practically self-aligning arrangement of the flow ducts.

According to one refinement of the invention, the heat exchanger housing has at least one connecting part, preferably an inlet-side and an outlet-side connecting part, for connecting at least one first fluid connection for the first fluid. The connecting part is in particular formed in one piece with the housing body. One refinement of the heat exchanger advantageously provides that a first fluid connection is arranged on the connecting part of the housing body so as to be flow-connected to the flow ducts. The first fluid connection may for example be formed as a tank and/or a tank cover, preferably in the form of a diffuser. An inlet-side fluid connection may be formed as an inlet diffuser and/or an outlet-side fluid connection may be formed as an outlet diffuser. Furthermore, it has proven to be advantageous to provide a bypass control device in the heat exchanger for adjusting the guidance of exhaust gas through the at least one heat exchanger. The control device may particularly advantageously be integrated in the fluid connection. A bypass flap may for example be integrated in a diffuser. Other possible advantageous control devices may additionally or alternatively be formed in the manner of a valve device, for example a controllable valve.

The connecting part of the heat exchanger housing may, in one particularly preferred refinement, be designed—on the one hand—in particular at the housing inner side so as to arrange a block closure element, for separating the chamber and a first fluid connection for the first fluid, on the connecting part of the housing body, and/or—on the other hand—in particular at the housing outer side so as to arrange the fluid connection on the connecting part. The block closure element, for example in the form of a base, is for this purpose preferably provided with one or more passage openings for the flow ducts.

In one particularly preferred refinement, it is provided for this purpose that the connecting part is formed as a flange. The flange preferably has a bead at the housing inner side and/or housing outer side, which bead preferably serves for holding a seal. It has been found that a particularly advantageous and fluid-tight separation of a first fluid into the flow ducts or a first fluid connection, and of a second fluid into the chamber, is possible in this way.

The heat exchanger housing preferably also has a second fluid connection for the second fluid, with the at least one second fluid connection, for example a fluid-inlet and a fluid-outlet connection, being formed in one piece with the housing body. A second fluid connection is particularly advantageously formed in the manner of a connecting pipe. This has proven to be particularly suitable for connecting a line for the second fluid.

In a form which combines the above-mentioned refinements, the heat exchanger housing is particularly advantageously provided with a connecting part for connecting at least one first fluid connection for the first fluid and a second fluid connection for the second fluid, with the first and second fluid connections being formed in one piece with the housing.

In one very particularly preferred refinement, it is provided that a connecting part has an inlet border for the first fluid and said inlet border and a further inlet border of the bypass duct are formed at the same point of a longitudinal extent of the housing body. For this purpose, the inlet border may in particular be formed in the connecting part as a common part of the housing body. In other words, a connecting part—for example in the form of an figure-eight-shaped flange—may have a first opening to the chamber and a second opening to the bypass duct. In addition or alternatively, the connecting part, likewise with the combination of the above-mentioned refinements, and a second fluid connection may be formed at the same point of a longitudinal extent of the housing body. For this purpose, the second fluid connection is preferably formed on the connecting part as a common part of the housing body. This has the advantage that a second fluid—in particular a coolant—and a first fluid—for example an exhaust gas and/or charge air—are supplied and discharged at practically the same point of the longitudinal extent of the heat exchanger housing, and are therefore guided adjacent to one another over a particularly long path along the longitudinal extent—this leads to a particularly advantageous cooling capacity of a heat exchanger.

The heat exchanger is preferably provided with a number of cooling fins which are formed in one piece with the housing body. Cooling fins may in particular run on the periphery and/or along a longitudinal extent of the housing body. Depending on requirements, the cooling fins may, for simplicity, run continuously on the bypass duct and on the chamber part of the housing. The cooling fins may fundamentally be designed, according to requirements and the heat quantity to be dissipated, and in addition or alternatively, as reinforcement ribs.

It has been found that the embodiment of the heat exchanger housing as an aluminum cast part is particularly preferably. The heat exchanger housing may fundamentally also be formed as a steel part or plastic part—preferably as an investment-cast part or injection-molded part.

Exemplary embodiments of the invention will now be described below on the basis of the. The latter should not necessarily illustrate the exemplary embodiments to scale; the drawing, where it serves for explanation, is in fact in schematic and/or slightly distorted form. With regard to additions to the teaching which can be directly gathered from the drawing, reference is made to the relevant prior art. Here, it should be taken into consideration that numerous modifications and changes regarding the shape and the detail of an embodiment may be carried out without departing from the general concept of the invention. The features of the invention disclosed in the description, in the drawing and in the claims may be essential to the refinement of the invention both individually and also in any desired combination. Furthermore, the scope of the invention also encompasses all combinations of at least two of the features disclosed in the description, the drawing and/or the claims. The general concept of the invention is not restricted to the exact shape or the detail of the preferred embodiment shown and described below, or restricted to a subject matter which would be restricted in relation to the subject matter described in the claims. Where dimensional ranges are specified, values lying within the stated limits should also be disclosed, and it should also be possible for said values to be arbitrarily used and claimed, as limit values.

Further objects, features and advantages of the present invention will become apparent from the detailed description of preferred embodiments that follows, when considered together with the accompanying figures of drawing.

DETAILED DESCRIPTION OF THE PREFERRED EMBODIMENTS

Figure 1:
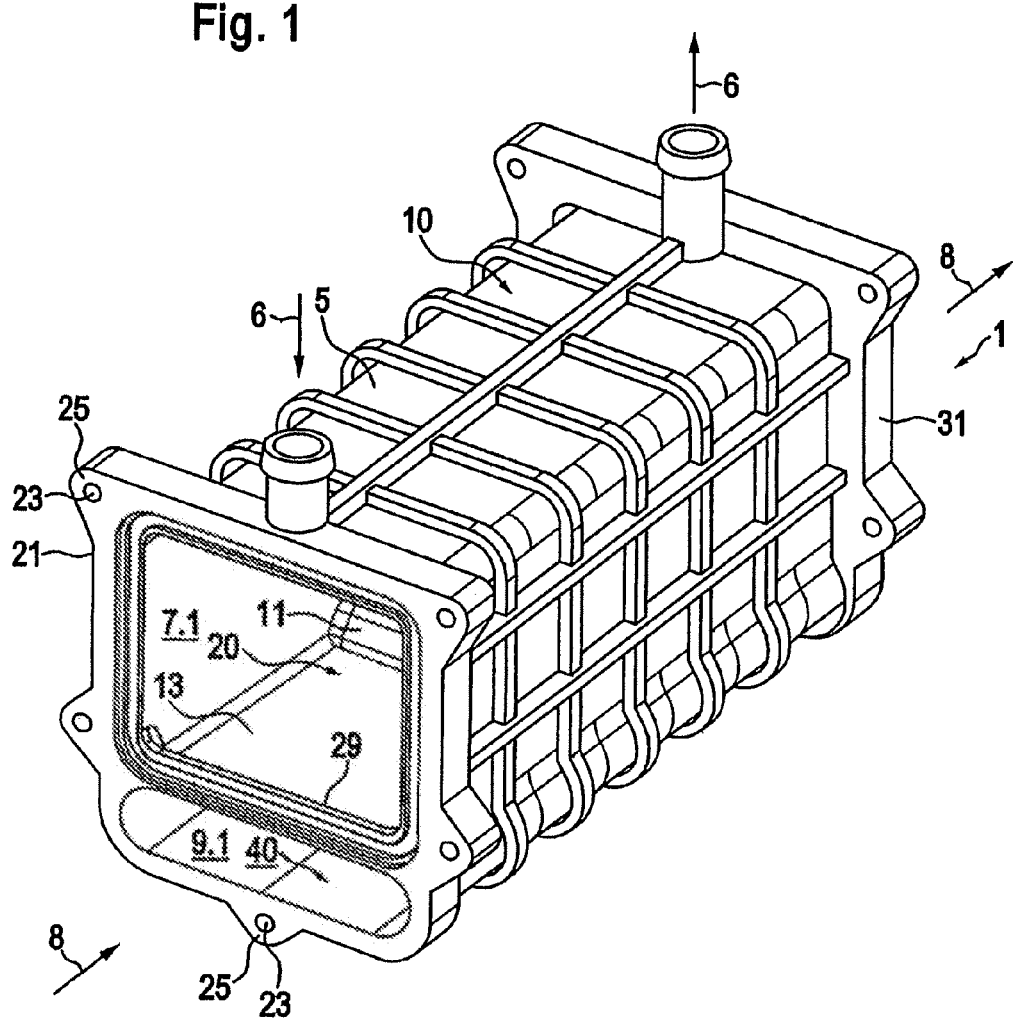
FIG. 1 shows a three-dimensional perspective view of a particularly preferred embodiment of the heat exchanger.
Figure 2:
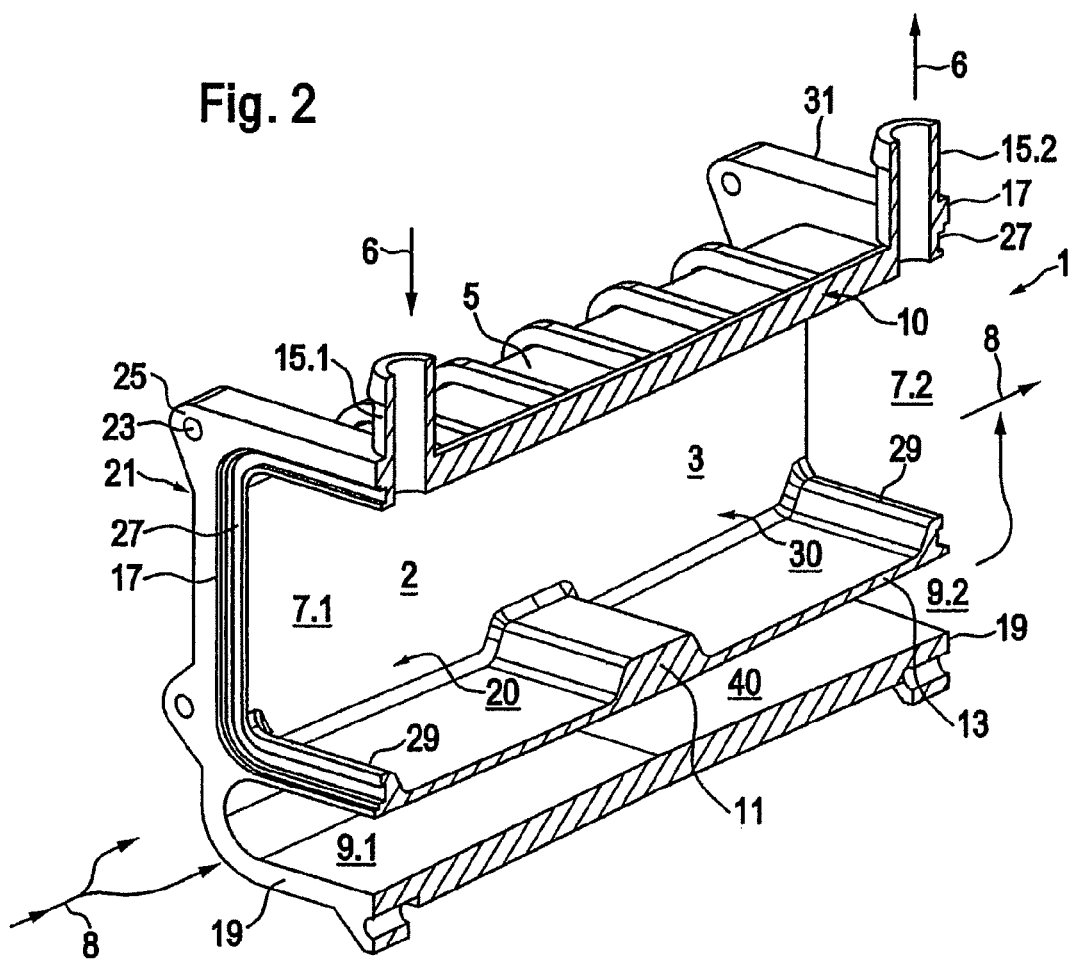
FIG. 2 shows a three-dimensional perspective partial view of the heat exchanger housing from FIG. 1.

FIGS. 1 and 2 show a heat exchanger housing 1 for arranging the flow ducts, which can be traversed by exhaust gas, of a high-temperature heat exchanger 2 (not illustrated) and the flow ducts, which can be traversed by exhaust gas, of a low-temperature heat exchanger 3, in each case in a first part 20 and in a second part 30 of a chamber of the housing body 10 of the heat exchanger housing 1. Said housing for the parts 20, 30 of the chamber is marked by a pedestal 11 which is trapezoidal in cross section and which is formed in one piece with the housing body 10, with the trapezoidal design of the pedestal 11 serving for the self-aligning arrangement of the high-temperature heat exchanger 2 and of the low-temperature heat exchanger 3 in the parts 20, 30. The heat exchanger housing 1 also has a bypass duct 40 which is separated by a partition 13 from the parts 20, 30 of the chamber. The pedestal 11 is formed in one piece with the partition 13.

Overall, the bypass duct 40, which is designed to be traversed by exhaust gas, and the parts 20, 30 of the chamber, are formed in one piece with the housing body 10. At the outside, the parts 20, 30 of the chamber and of the bypass duct 40 are delimited by a wall 5 of the housing body 10, wherein in a cross-section transversely with respect to the longitudinal extent of the housing 1, the wall 5 and the partition 13 assume the shape of a figure eight, which form in each case an inlet-side and outlet-side first opening 7.1 and 7.2 to the first part 20 and second part 30 of the chamber, and an input-side second opening 9.1 and 9.2 to the bypass duct 40.

The heat exchanger housing 1 is therefore designed to be traversed by exhaust gas 8 through the openings 7.1, 7.2 and/or 9.1, 9.2.

Furthermore, an inlet-side second fluid connection 15.1 and an outlet-side second fluid connection 15.2 for supplying and discharging the coolant 6 are formed, in each case in the manner of a connecting pipe, in one piece with the housing body 10.

The embodiment of a heat exchanger described in FIGS. 1 and 2 particularly advantageously realizes an inlet border 17 of a first part 20 and of a second part 30 of the chamber and an inlet border 19 of the bypass duct 40 and a second fluid connection 15.1 and 15.2 as a common connecting part 21 and 31 of the housing body 10. The input-side connecting part 21 and also the output-side connecting part 31 are formed in the present case in each case in the manner of a figure-eight-shaped flange which—at the corners of a part 20, 30 of the chamber—is provided with eyes 25 which have fastening openings 23 in order to attach a tank cover thereto at the housing outer side, which tank cover is formed as a diffuser for supplying and discharging the exhaust gas. A further eye 25 which is provided with a fastening opening 23 is arranged on the connecting part 21 and 31 centrally below the bypass duct 40.

Furthermore, the connecting part 21, 31 is provided with a bead 27 for holding a seal, in order to sealingly arrange in each case one diffuser on the connecting part 21, 31, and to thereby permit sealing of the coolant, which is guided in the parts 20, 30, with respect to the exhaust gas.

A block closure element in the form of a base can be fixed, in a manner not illustrated in any more detail, to an inner side 29 of the connecting part 21, 31. A base of said type is provided with a plurality of passage openings for holding the flow ducts of the high-temperature heat exchanger 2 and of the low-temperature heat exchanger 3. In a manner which is not illustrated, it is possible for additional bases in each case of the high-temperature heat exchanger 2 and of the low-temperature heat exchanger 3 to be arranged on the pedestal 11.

Within the context of the above-described embodiment of a heat exchanger housing 1, therefore, a housing body 10 is provided, having a chamber which is designed to be traversed by coolant and to hold a number of flow ducts which can be traversed by exhaust gas, and also a bypass duct 40 which is designed to be traversed by exhaust gas, which chamber and bypass duct 40 are both formed in one piece with the housing body 10. Furthermore, the housing body 10 as per the embodiment described above may particularly advantageously be formed in one piece with connecting parts 21, 31 which combine corresponding borders 17, 19 of the chamber and of the bypass duct 40 and also connecting pipes 15.1, 15.2 for the coolant, and which are also advantageously formed for arranging a diffuser at the housing outer side and a base at the housing inner side. This permits not only particularly cost-effective but also particularly simple production of a heat exchanger, since the heat exchanger can be produced in one production step, in the present case in an aluminum casting process. In a modification of the present embodiment, the heat exchanger housing can also be produced as an investment-cast steel part or as an injection-molded plastic part.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A heat exchanger housing for first and second heat exchangers for exchanging heat between a first fluid, the first fluid being exhaust gas or charge air, and a second fluid, the second fluid being a coolant, comprising:
    a housing body including:
        a chamber configured to be traversed by the second fluid and to hold flow ducts configured to be traversed by the first fluid;
        a bypass duct configured to be traversed by the first fluid; and
        a partition configured to separate the chamber and the bypass duct,
    wherein the chamber includes a first part configured to receive the first heat exchanger and a second part configured to receive the second heat exchanger, the first and second parts being in fluid communication and partially separated by a pedestal disposed on the partition, and
    wherein the chamber, the pedestal, the partition and the bypass duct are integrally formed as one piece with the housing body.

2. The heat exchanger housing according to claim 1, further comprising at least one connecting part for connecting at least one first fluid connection for the first fluid, wherein the at least one connecting part is integrally formed as one piece with the housing body.

3. The heat exchanger housing according to claim 1, further comprising a connecting part that comprises a flange with a bead for holding a seal.

4. The heat exchanger housing according to claim 1, further comprising a separate inlet-side connecting part and a separate outlet-side connecting part with respect to the first fluid.

5. The heat exchanger housing according to claim 1, further comprising at least one second fluid connection for the second fluid, wherein the at least one second fluid connection comprises at least one connecting pipe and is integrally formed as one piece with the housing body.

6. The heat exchanger housing according to claim 1, further comprising a connecting part having a connecting part inlet border for the first fluid, wherein the connecting part inlet border and a bypass duct inlet border of the bypass duct are formed at a same point of a longitudinal extent of the housing body such that the connecting part inlet border and the bypass duct inlet border are formed on the connecting part as a common part of the housing body.

7. The heat exchanger housing according to claim 1, further comprising a connecting part and a second fluid connection at a same point of a longitudinal extent of the housing body such that the second fluid connection is formed on the connecting part as a common part of the housing body.

8. The heat exchanger housing according to claim 1, wherein the pedestal is trapezoidal in cross section and is transverse with respect to a longitudinal extent of the housing body on an inner side.

9. The heat exchanger housing according to claim 1, further comprising cooling fins, at least one of the cooling fins configured to run around a periphery of the housing body, run along a longitudinal extent of the housing body or a combination thereof, wherein the cooling fins are integrally formed as one piece with the housing body.

10. The heat exchanger housing according to claim 1, wherein the heat exchanger housing is in a form of an investment-cast part, a die-cast part or an injection-molded part in a form of an aluminum, steel or plastic part.

11. The heat exchanger housing according to claim 1, wherein a cross section of the bypass duct is rectangular, oval or semi-oval.

12. A heat exchanging unit having first and second heat exchangers for exchanging heat between a first fluid, the first fluid being exhaust gas or charge air, and a second fluid, the second fluid being a coolant, comprising:
a block for separate and heat-exchanging guidance of the first fluid and the second fluid,
wherein the block has a heat exchanger housing according to claim 1, and flow ducts configured to be traversed by the first fluid and held in the heat exchanger housing.

13. The heat exchanging unit according to claim 12, further comprising at least one first fluid connection, wherein the at least one first fluid connection is at least one of a tank and a tank cover that is flow-connected to the flow ducts, and wherein the at least one fluid connection is on a connecting part of the housing body.

14. The heat exchanging unit according to claim 12, further comprising at least one fluid connection comprising a diffuser, the diffuser being at least one of an inlet diffuser and an outlet diffuser.

15. The heat exchanging unit according to claim 12, wherein a block closure element for separating the chamber and a first fluid connection for the first fluid is on a connecting part of the housing body, and wherein the block closure element is a base and includes one or more passage openings for the flow ducts.

16. The heat exchanging unit according to claim 12, further comprising a bypass control device for adjusting a guidance of the exhaust gas through the heat exchanger, the bypass control device being at least one of a valve device, a bypass flap, a valve, and an exhaust-gas recirculation valve.

17. The heat exchanging unit according to claim 12, further comprising a control device integrated in a first inlet-side fluid connection, the control device being a bypass flap integrated in a diffuser.

18. The heat exchanging unit according to claim 12, wherein the first heat exchanger is a high-temperature heat exchanger and the second heat exchanger is a low-temperature heat exchanger, wherein the low-temperature heat exchanger is downstream of the high-temperature heat exchanger.

19. An exhaust-gas recirculation system for an internal combustion engine, comprising an exhaust-gas recirculation line, a compressor, and a heat exchanging unit according to claim 12, wherein the first and second heat exchangers comprise an exhaust-gas heat exchanger, the exhaust-gas heat exchanger being a cooler.

20. A charge-air supply system for an internal combustion engine, comprising a charge-air induction system, an air filter, a compressor, and a heat exchanging unit according to claim 12, wherein the first and second heat exchangers comprise an exhaust-gas heat exchanger, the exhaust-gas heat exchanger being a cooler.

21. A vehicle comprising:
an internal combustion engine, the internal combustion engine being a diesel engine or a spark-ignition engine; and
a heat exchanging unit according to claim 12.

22. The heat exchanger housing according to claim 1, wherein the pedestal traverses an entire width of an inner side of the partition facing the chamber.

* * * * *